No. 764,398. PATENTED JULY 5, 1904.
G. W. UPTON.
FISHING ROD.
APPLICATION FILED DEC. 17, 1903.
NO MODEL.
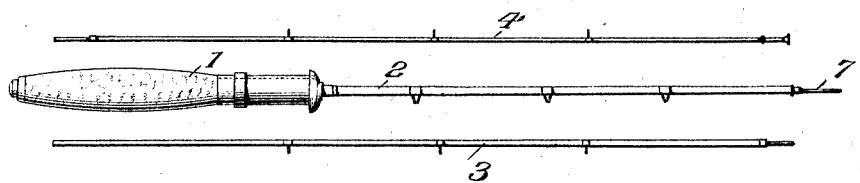
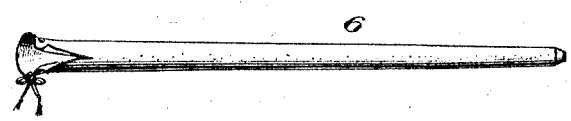
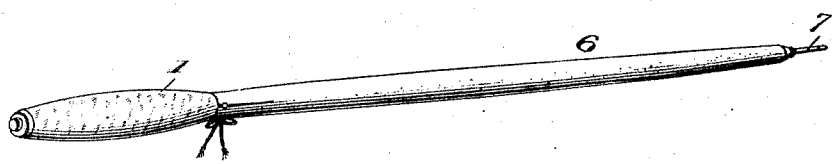
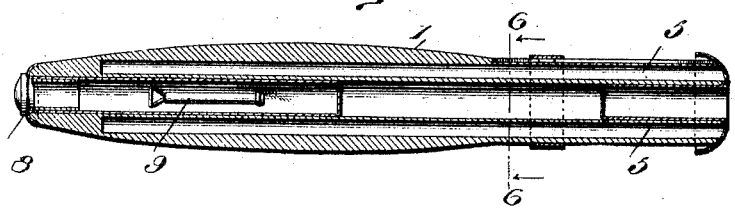
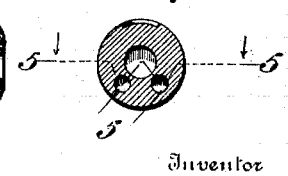
Witnesses
Francis S. Maguire
Inventor
George W. Upton
By
Attorney No. 764,398. Patented July 5, 1904.

UNITED STATES PATENT OFFICE.

GEORGE W. UPTON, OF WARREN, OHIO.

FISHING-ROD.

SPECIFICATION forming part of Letters Patent No. 764,398, dated July 5, 1904.

Application filed December 17, 1903. Serial No. 135,524. (No model.)

*To all whom it may concern:*

Be it known that I, GEORGE W. UPTON, of Warren, in the county of Trumbull and State of Ohio, have invented certain new and useful Improvements in Fishing-Rods; and I do hereby declare the following to be a full, clear, and exact description of the invention, such as will enable others skilled in the art to which it appertains to make and use the same.

The object of this invention is to so construct a fishing-rod that the joints or sections thereof while possessing maximum length are capable of being folded in a very short case, the ends of the short joints or sections being protected from injury.

A further object is to utilize only the joints or sections and handle of the rod for presenting when folded within a case the appearance of an umbrella.

The invention will be hereinafter fully set forth, and particularly pointed out in the claims.

In the accompanying drawings, Figure 1 shows in side elevation the several parts of a rod arranged side by side. Fig. 2 shows the end and intermediate joints or sections in position to be inclosed. Fig. 3 is a view of the inclosing case. Fig. 4 shows the rod inclosed in the case. Fig. 5 is an enlarged longitudinal sectional view of the handle. Fig. 6 is an end view thereof.

Referring to the drawings, 1 designates the handle; 2, the base-section of the rod capable of being secured in either end of the handle, which latter is provided with a central bore or socket for that purpose. 3 and 4 are the intermediate and end sections, the length of each being considerably longer than is ordinarily the case with these members. To allow of thus increasing the length of these outer joints or sections without increasing the length of the whole when wrapped and also to protect from breakage the ends of the sections 3 and 4, I form in the handle 1 pockets 5 in the form of holes or bores extending from one end thereof longitudinally to near the other end. These pockets are formed sufficiently near the central bore or socket to insure the two outer sections being in close relation or parallelism to the base-section when the parts are to be folded. With the reduced ends of the two smaller sections thus positioned within the handle, their outer ends are considerably short of the outer end of the base-section. Thus I protect both ends of the two outer sections of the rod.

The tube-like cover 6 resembles an umbrella-cover, with an opening at its narrow end to accommodate the protruding portion of the base-section, the end whereof serves as a ferrule, such end being closed by a cap or plug 7 to prevent the entrance of dirt. The wider end of the cover is tied by strings at the inner end of the handle.

In addition to the advantages herein recited it is obvious that without unnecessarily increasing the length of the article when folded the lengths of the rod-sections are so increased that for some purposes one or two of them may be long enough for actual use. The reel may be secured for bait-casting above the hand and for fly-casting below the hand, the base-section being capable of being secured in either end of the handle. The end of the latter not in use is closed by an ordinary butt-cap 8, wherein the tip-piece 9 may be placed.

The advantages of my invention are apparent. By forming the pockets in the handle the smaller joints or sections are not only protected, but their lengths may be so increased as to obtain a long rod, which latter may be packed in a small case.

I claim as my invention—

1. A fishing-rod having a base-section, and one or more additional sections, the handle for the base-section having pockets formed therein to accommodate portions of such additional sections, and a cover for inclosing the several sections, the outer end of such base-section extending beyond such cover at one end thereof.

2. A fishing-rod having a handle formed with a central bore or socket, and additional bores paralleling the former bore and extending from one end of the handle to near the other end thereof, and the several rod-sections, the base-section thereof being secured in such central bore, while ends of the other sections are secured in such additional bores, the outer ends of such latter sections being within the plane of the outer end of the base-section.

3. The combination with the handle having a central bore and two longitudinal bores parallel therewith extending from one end of the handle to near the other end, the several rod-sections secured each at one end in one of said bores, the base-section extending at its outer end beyond the outer ends of the other sections, and a tube-like cover having an opening at one end through which the extended end of the base-section is designed to project.

4. A fishing-rod having a handle formed with a central bore or socket, and additional bores paralleling the former bore and extending from one end of the handle to near the other end thereof.

5. The combination with the handle having a central bore and one or more longitudinal bores parallel therewith extending from one end of the handle to near the other end, the several rod-sections being secured each at one end in one of said bores.

In testimony whereof I have signed this specification in the presence of two subscribing witnesses.

GEORGE W. UPTON.

Witnesses:
HARRIET T. UPTON,
J. L. HERZOG.